(12) United States Patent
Smith et al.

(10) Patent No.: US 7,171,647 B1
(45) Date of Patent: Jan. 30, 2007

(54) METHOD FOR CONSTRUCTING A PROCESS-DRIVEN SYSTEM

(75) Inventors: Simon Robert Smith, York (GB); Richard Paul Whittington, York (GB)

(73) Assignee: The Salamander Organization Ltd, York (GB)

( * ) Notice: Subject to any disclaimer, the term of this patent is extended or adjusted under 35 U.S.C. 154(b) by 0 days.

(21) Appl. No.: 09/506,189

(22) Filed: Feb. 17, 2000

(30) Foreign Application Priority Data

Feb. 19, 1999 (GB) ................................. 9903830.9

(51) Int. Cl.
*G06F 9/44* (2006.01)
(52) U.S. Cl. .................... 717/105; 717/103; 717/104; 705/8; 705/9
(58) Field of Classification Search ........ 717/104–109, 717/124–125, 102, 120, 123, 110–113; 345/762–763, 345/223; 707/103 R; 709/223; 705/1
See application file for complete search history.

(56) References Cited

U.S. PATENT DOCUMENTS

| | | | | |
|---|---|---|---|---|
| 5,745,901 A | * | 4/1998 | Entner et al. ........... 707/103 R |
| 5,892,947 A | * | 4/1999 | DeLong et al. ............... 703/22 |
| 5,930,512 A | * | 7/1999 | Boden et al. ................ 717/102 |
| 6,097,887 A | * | 8/2000 | Hardikar et al. ............ 717/105 |
| 6,173,438 B1 | * | 1/2001 | Kodosky et al. ............ 717/105 |
| 6,199,193 B1 | * | 3/2001 | Oyagi et al. ................ 717/101 |
| 6,219,055 B1 | * | 4/2001 | Bhargava et al. ........... 345/420 |
| 6,225,998 B1 | * | 5/2001 | Okita et al. ................. 345/853 |
| 6,370,508 B2 | * | 4/2002 | Beck et al. ..................... 705/1 |
| 6,381,640 B1 | * | 4/2002 | Beck et al. .................. 709/223 |
| 6,430,609 B1 | * | 8/2002 | Dewhurst et al. ........... 709/220 |
| 6,483,524 B1 | * | 11/2002 | Petchenkine et al. ....... 345/763 |
| 2002/0032669 A1 | * | 3/2002 | Smith et al. .................. 706/21 |

OTHER PUBLICATIONS

Pyron, Tim, "Special Edition: Using Microsoft Project 98", Que Publishing, 1997, pp. 1-33.*
Leymann et al., "Business Management With FlowMark", IEEE, 1994, pp. 230-234.*
"Visual WorkFlo"; FileNET, Panagon; 1999 FileNET Corporation (product literature).*
Mentzas et al., "Workflow on the Web: Integrating E-Commerce and Business Process Management", International Journal of E-Business Strategy Management, Nov./Dec. 1999, vol. 1, No. 2, pp. 147-157.*
Georgakopoulos et al., "An Overview of Workflow Management: From Process Modeling to Workflow Automation Infrastructure", Distributed and Parallel Databases, 3; 1995, pp. 119-153.*

* cited by examiner

*Primary Examiner*—Kakali Chaki
*Assistant Examiner*—William H. Wood
(74) *Attorney, Agent, or Firm*—Head Johnson & Kachigian

(57) ABSTRACT

A method for creating a process-driven information system. The method comprises the steps of creating a process model or models comprising one or more elements which are available in a browser-compatible format, creating one or more software components which are accessible in a browser compatible format and generating a process-driven information system comprising one or more elements of the process model which act as the user interface to the one or more software components. This method allows the rapid creation by non-technical users of process models describing the working of an organization with the models being used as the user interface for directing the operation of a collection of software components.

5 Claims, 10 Drawing Sheets

METHOD FOR CONSTRUCTING A PROCESS-DRIVEN SYSTEM

CROSS-REFERENCE TO RELATED APPLICATIONS

This application claims priority to GB Application No. 9903830.9 filed 19 Feb. 1999.

BACKGROUND OF THE INVENTION

The present invention relates to a method for constructing a process-driven information system, and more particularly to a method for the development of business process models for distribution through web browsers, and the provision of access to diverse information sources and system functionality through said models.

The development and distribution of process models is increasingly valued as the focus for many business improvement endeavours, ensuring that business workers appreciate how their part of the business works and how their contribution relates to other parts of the business. The value of process models can come both from enhanced business performance, and from the reduction in risk of failures of adherence to best practise, whether that best practise is defined within the organisation or by a regulatory body.

Realising the potential value of process models requires the dissemination of models which fulfil the following requirements:

1) Can reflect various aspects of the business processes; and
2) Which actively support the business workers in carrying out their work.

As an example of the first requirement, a product delivery process is likely to require co-ordination between technical, financial, logistical and marketing responsibilities; and an individual financial analyst needs to be able to identify the tasks currently required of them, and to appreciate the context of their analysis, including the likely consequences of their judgements or recommendations.

As an example of the second requirement, said product delivery process is likely to require computer support which is integrated with the various coordinated responsibilities, and available to a financial analyst within the context of these responsibilities.

Inventions in the field of process modelling have attempted to address the first of these requirements e.g. by providing graphical representations of processes [U.S. Pat. No. 5,819,270], or mapping processes to workflow structures [U.S. Pat. No. 5,630,069], and this work is cited here as prior art. These inventions provide a visualisation of business processes in the context of business intent and direction. A number of prior approaches exist to disseminate business models widely across a business, typically comprising business modelling software combined with a facility to generate a set of web based pages representing these models, navigable by business workers. However these approaches do not provide for the enactment of processes i.e. the manipulation of resources by workers which are required to put the business steps which are the subject of the models into practice.

Inventions in the field of process enactment and workflow have attempted to address the second of these requirements, through:

A. Methods and apparatus for developing workflow systems to support ordered activities carried out by a collection of users and examples of this are disclosed in the prior art patents U.S. Pat. No. 5,799,297, U.S. Pat. No. 5,216,592, U.S. Pat. No. 5,301,320, U.S. Pat. No. 574,661.

B. Systems to address the task needs of users independently of their co-workers and an example of this is disclosed in U.S. Pat. No. 553,861

These documents illustrate systems to provide support for the manipulation of business resources by workers, but typically lack visualisation, contextual positioning and awareness for workers within the processes of a business.

There have been previous attempts to bring these two areas of business process modelling and understanding, and resource manipulation, together using workflow systems to address specialist functional requirements such as illustrated in U.S. Pat. No. 5,745,901 or using specific modelling languages of tasks and actions as illustrated in U.S. Pat. No. 5,734,837, so concentrating only on processes which are to have an enactment through computer support. The call centre is a typical embodiment of such a concept. Products which attempt a more general linking of these two areas have used proprietary technologies to do so.

It is therefore an aim of the present invention to provide a general, open method for a process model, which addresses both of the requirements illustrated above and to allow the potential value of the business modelling as outlined in the above to be realised.

SUMMARY OF THE INVENTION

According to the present invention there is provided a method for creating a process-driven information system, said method comprising the following steps:

creating a process model of a system comprising one or more elements, said model created in a browser-compatible format using this model to identify the requirements for software support creating one or more software components in a browser-compatible format satisfying these requirements generating a process-driven information system comprising said one or more elements of said process model acting as the user interface to said software components.

Typically the process model is part of a general purpose graphical business model.

In one embodiment the software components are accessed by the user selection of one or more of the process model elements. Typically the process model is illustrated on a display screen and the elements can be selected by any conventional user control system such as mouse, keyboard etc. and when an element is selected an appropriate display is generated for any associated software component.

Further preferably the process model is accessible via a web browser.

Typically the one or more elements of the process model are provided in a tool which uniquely identifies each element and maps each element to one or more software components, in one example, in the form of arbitrary alternative web pages and/or web-based resources.

In use, a modeller/user follows the method described above to create a set of general purpose graphical business models containing various linked elements in a tool, said tool able to generate models which are accessible by a web browser and which links the model elements in the browser by uniquely identifying each element and corresponding web page. A preferred embodiment of the invention allows the modeller to preview the web page of a model element, and map this model element to an arbitrary alternative web-based resource.

In addition, a preferred embodiment of the present invention implements the concept of user-driven information system development utilising open standards in process modelling and software component development based on web browser technologies.

The advantage of the present invention is that it provides a method for creating a process driven information system which can communicate and disseminate arbitrary business intent, additionally providing the task support characteristics of workflow software, typified by its ability to provide coordination and awareness support for business users carrying out their work within the organisation. The method allows non-technical users to rapidly create process models which describe the working of an organisation. The models can be used as the user interface for directing the operation of a collection of software components.

BRIEF DESCRIPTION OF THE DRAWINGS

Embodiments of the invention will now be described with reference to the accompanying Figures wherein.

DETAILED DESCRIPTION OF THE PREFERRED EMBODIMENT

The models for this example were generated using a process modelling tool, "MooD Business Developer", and Mood Web Publisher, TM MooD and the screen display of the web-based form was developed in "Microsoft Visual InterDev" TM Microsoft. It should however be appreciated that other alternative products could be used to perform the same functions.

Figure 1:
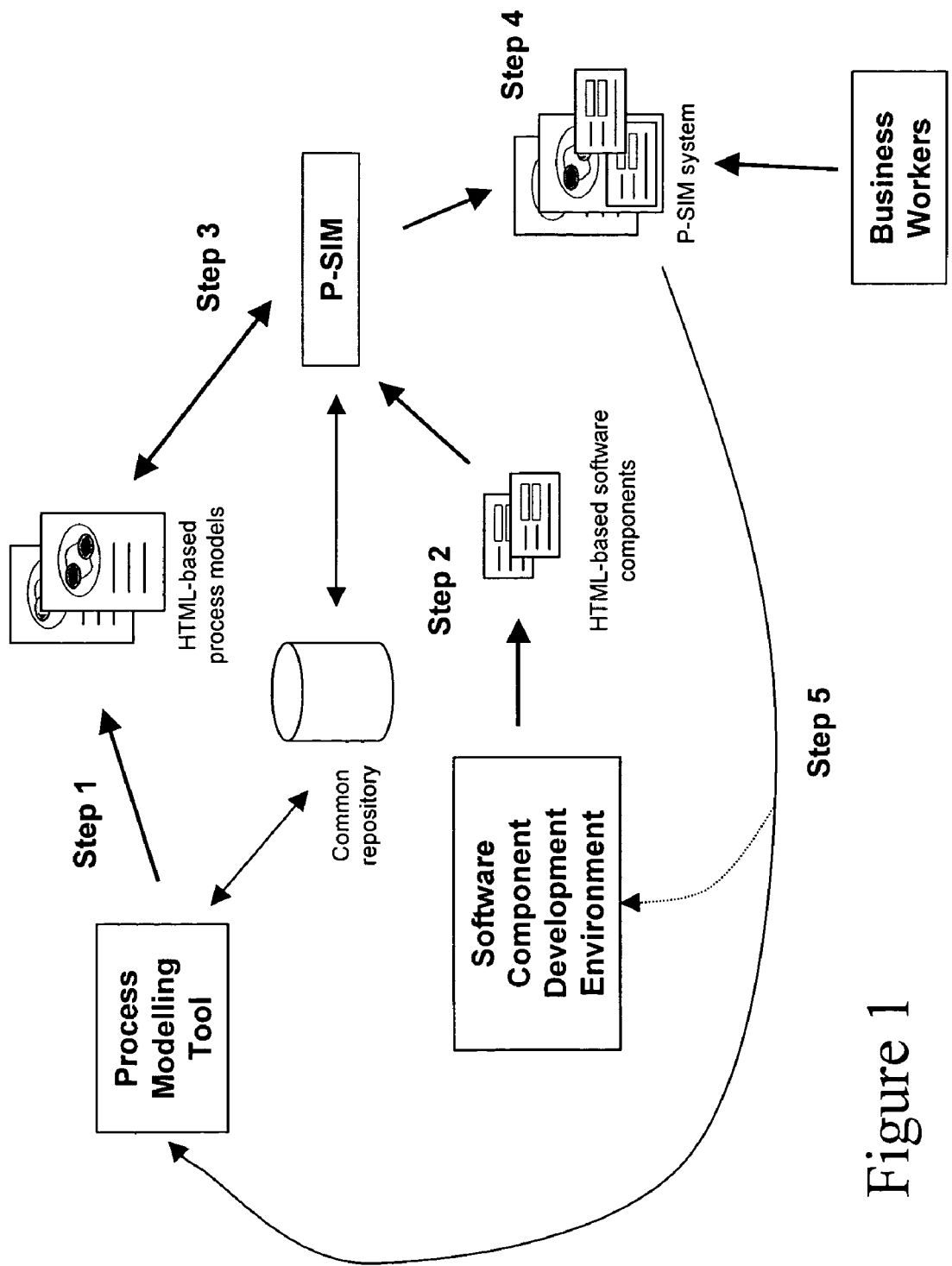
FIG. 1 represents an embodiment of the architecture of the apparatus of the present invention.

In the following description, an example of the method according to the invention is referred to as "PSIM" (Process-Systems Integration Method). The underlying concept of PSIM is to harmonise the enactment of business processes with the delivery of associated computer support by linking graphical maps of arbitrary business processes to software resources used in the support of those processes, presenting a consistent operating interface for all users. A preferred embodiment of PSIM is shown in FIG. 1 and is as follows:

1. A modelling team creates a set of process models 2 representing the business to be modelled and a tool 4 which generates browser-compatible outputs is used, also noting the software behaviour (e.g. information access and information recording) required to support each process.

2. A development team creates a set of browser-compatible resources (e.g. software components or documents) 6 based on the requirements determined in step 1.

3. The modelling and/or development team creates a mapping between model elements and software components such as documents or databases in accordance with the invention 8, which stores the mappings and modifies the collection of web pages appropriately.

4. The resulting PSIM system 10 is published to the user community 12.

5. The above 4 steps are typically periodically repeated in a review cycle in which the process models and resources of the PSIM system 10 are revised and re-published.

Figure 2:
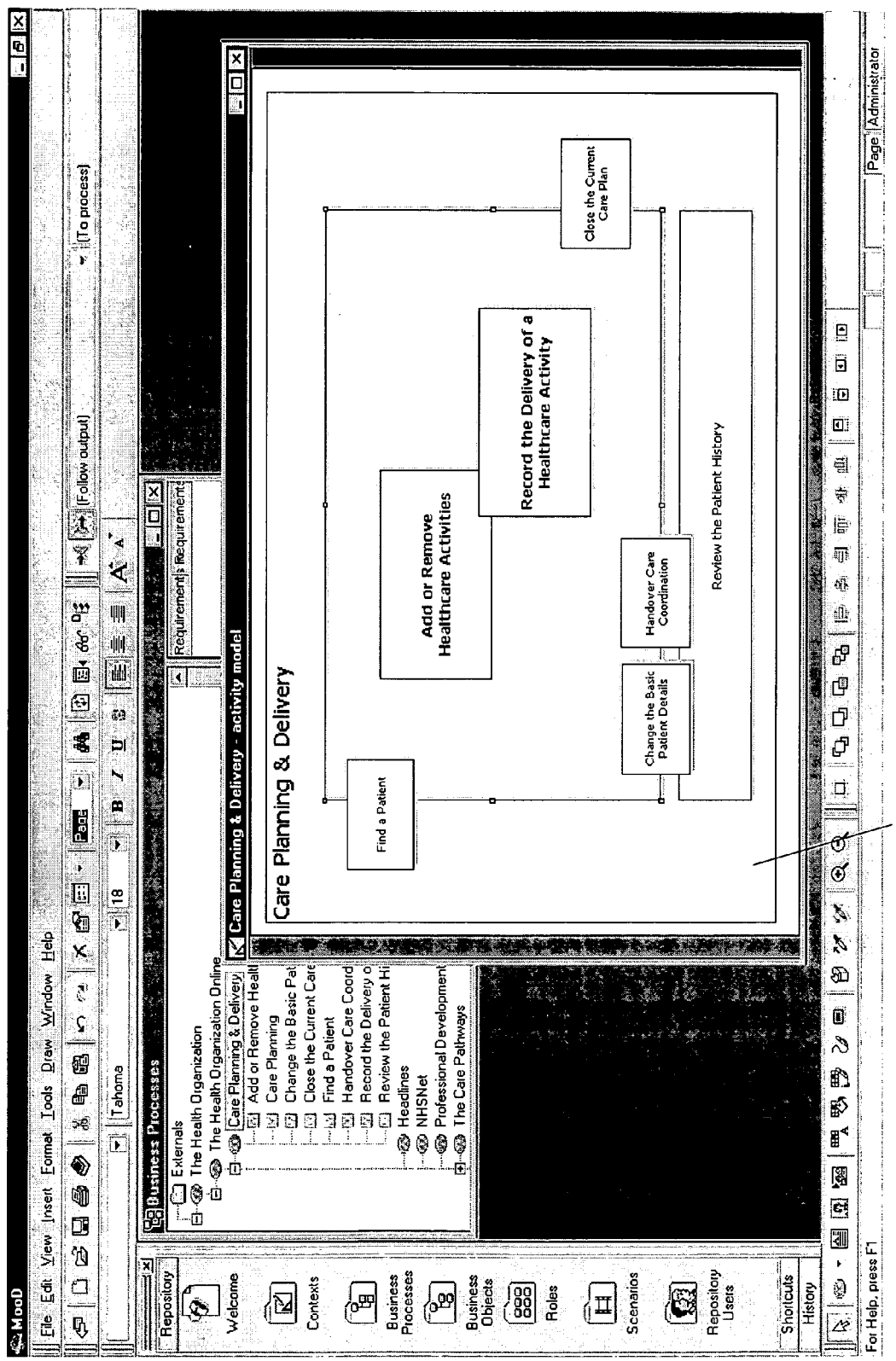
FIG. 2 shows a screen display of a 'Care Planning and Delivery Process'.

An example which illustrates the first four steps of the above preferred embodiment is as follows:

A process model is required to be developed for a health-care process:

1. A team of health care experts defines a set of elements representing the work carried out, such as care pathways with a model of patient care 12 using a business modeling tool 14; and the models are published in HTML format using the "MooD Web Publisher", which uses the unique identified of each process as the basis for the process's URL. An example is the model of 'Care Planning and Delivery' as shown in FIG. 2.

Figure 4:
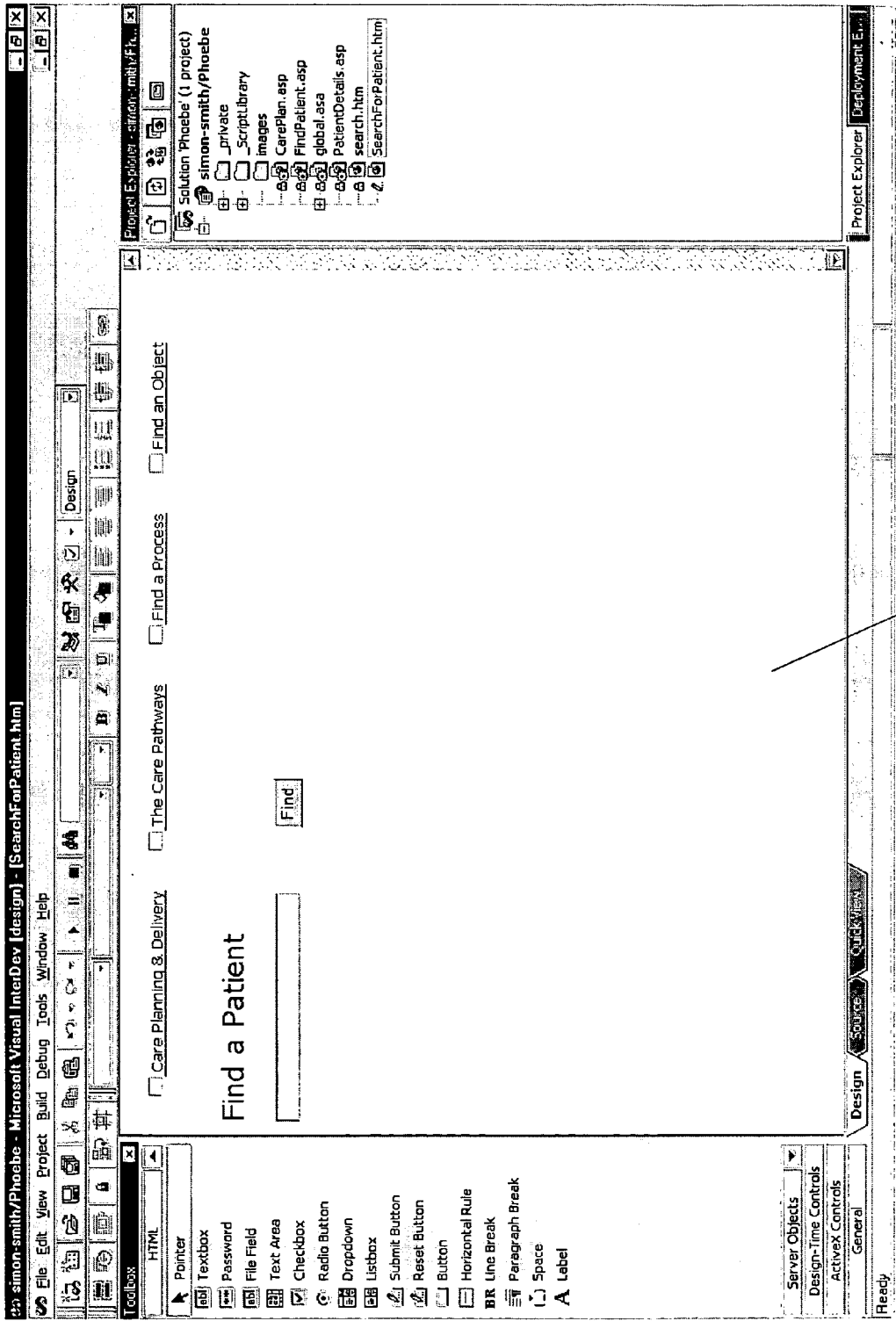
FIG. 4 shows a screen display allowing the searching of a patient database.

2. A team of software developers develops a set of browser-based support software application and information components to implement the behavior required by the processes developed in step one. FIG. 4 depicts an example of a "Find Patient" Form 16 which can be used to list all patients recorded in a particular database matching a certain surname.

Figure 3:
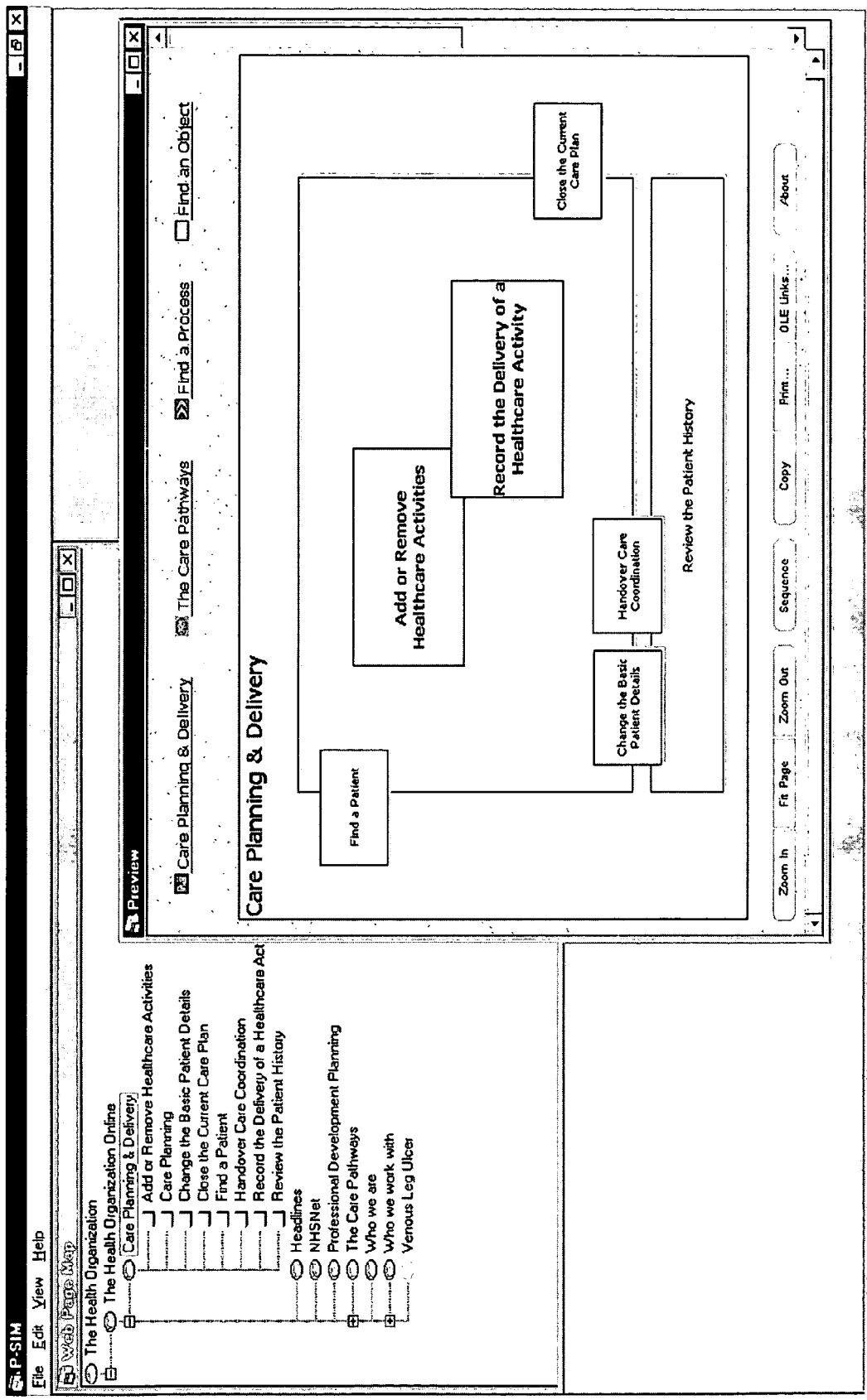
FIG. 3 shows a screen display of the 'Care Planning and Delivery Process' utilising a process model in accordance with the invention, allowing a preview of the web-based model generated from the business modelling software.
Figure 5:
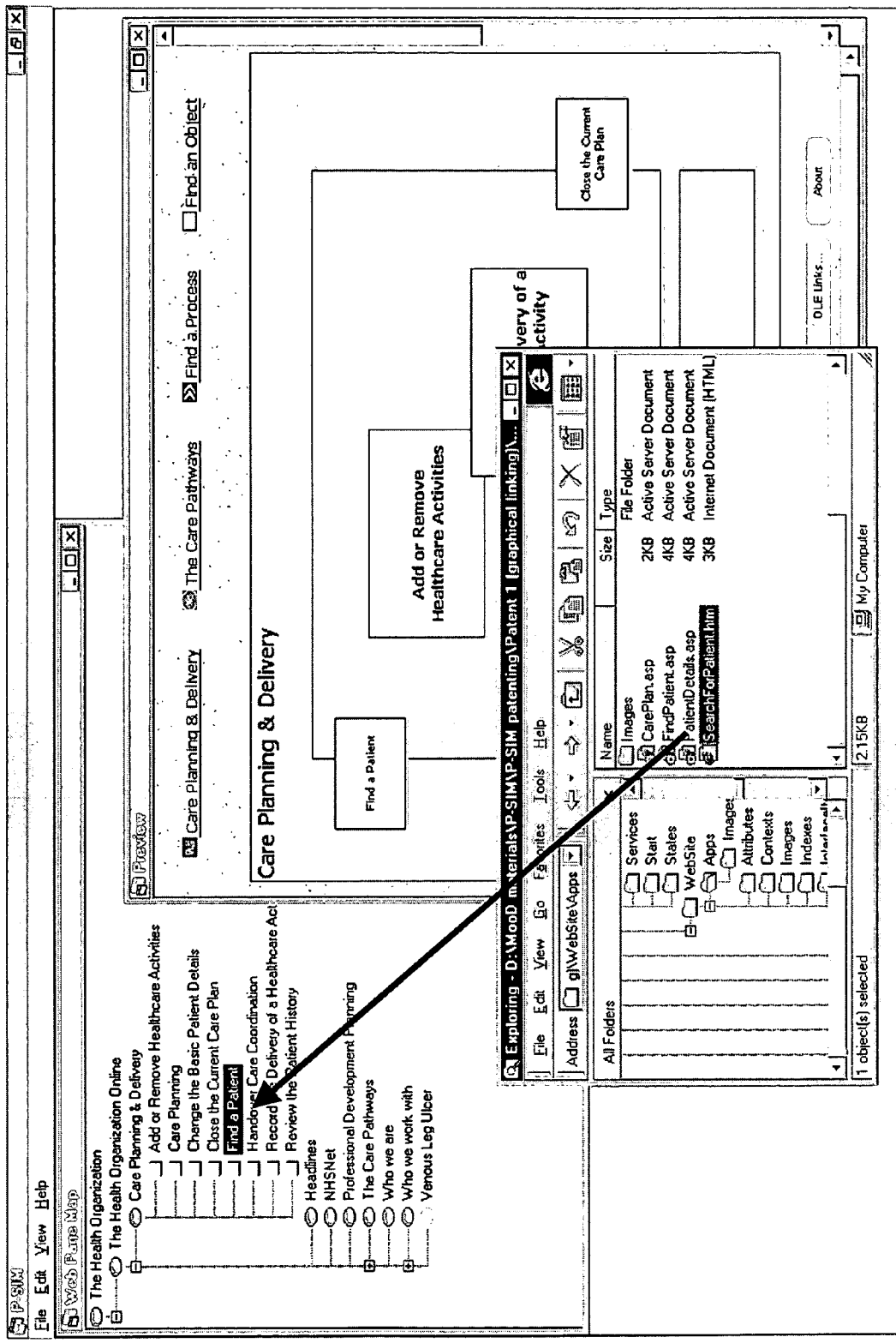
FIG. 5 shows a screen display of the drag-and-drop of the web-based form from FIG. 4 onto the model element 'Find a Patient' in accordance with the invention.
Figure 6:
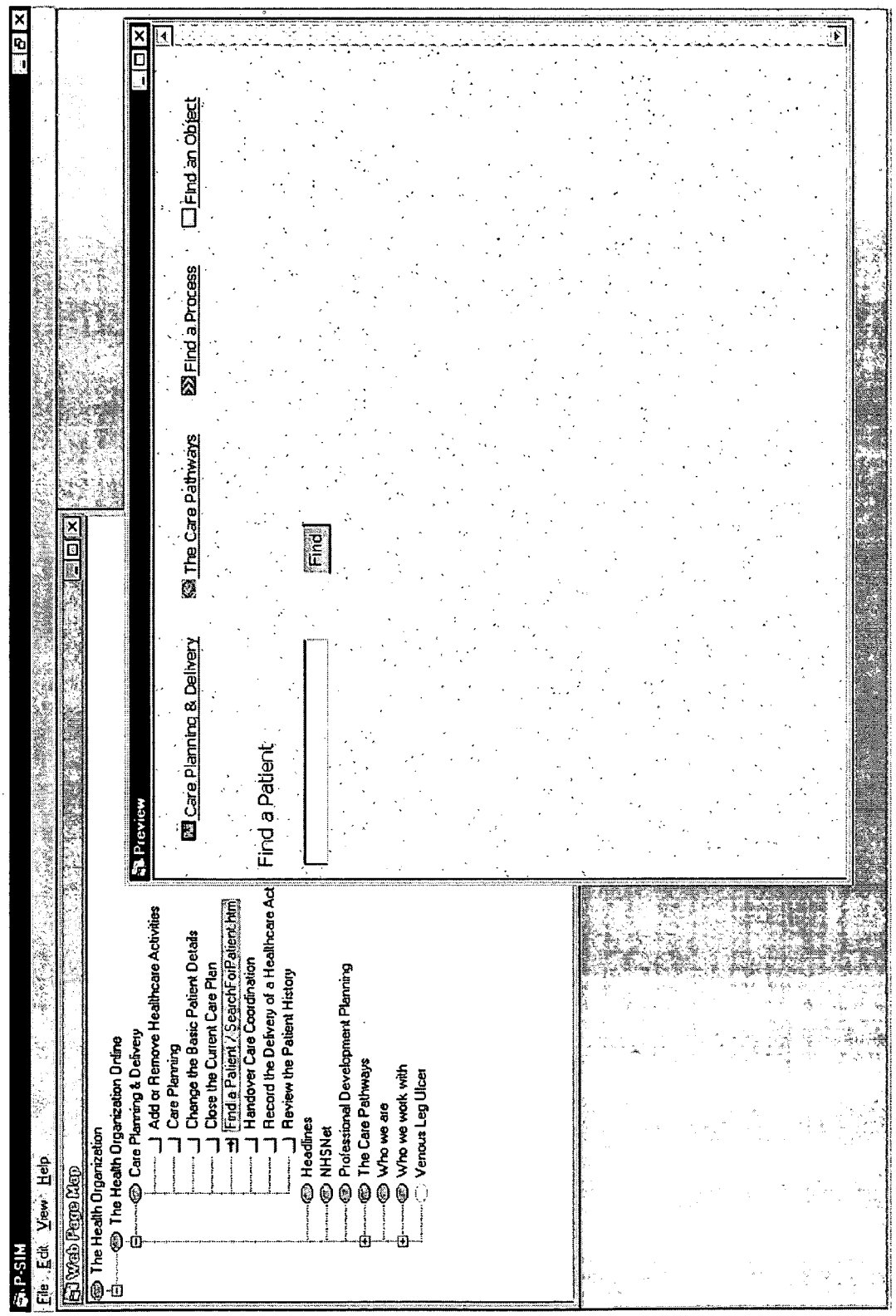
FIG. 6 shows a screen display of the electronic form from FIG. 4 mapped to the model element 'Find a Patient' in accordance with the invention.
Figure 7:
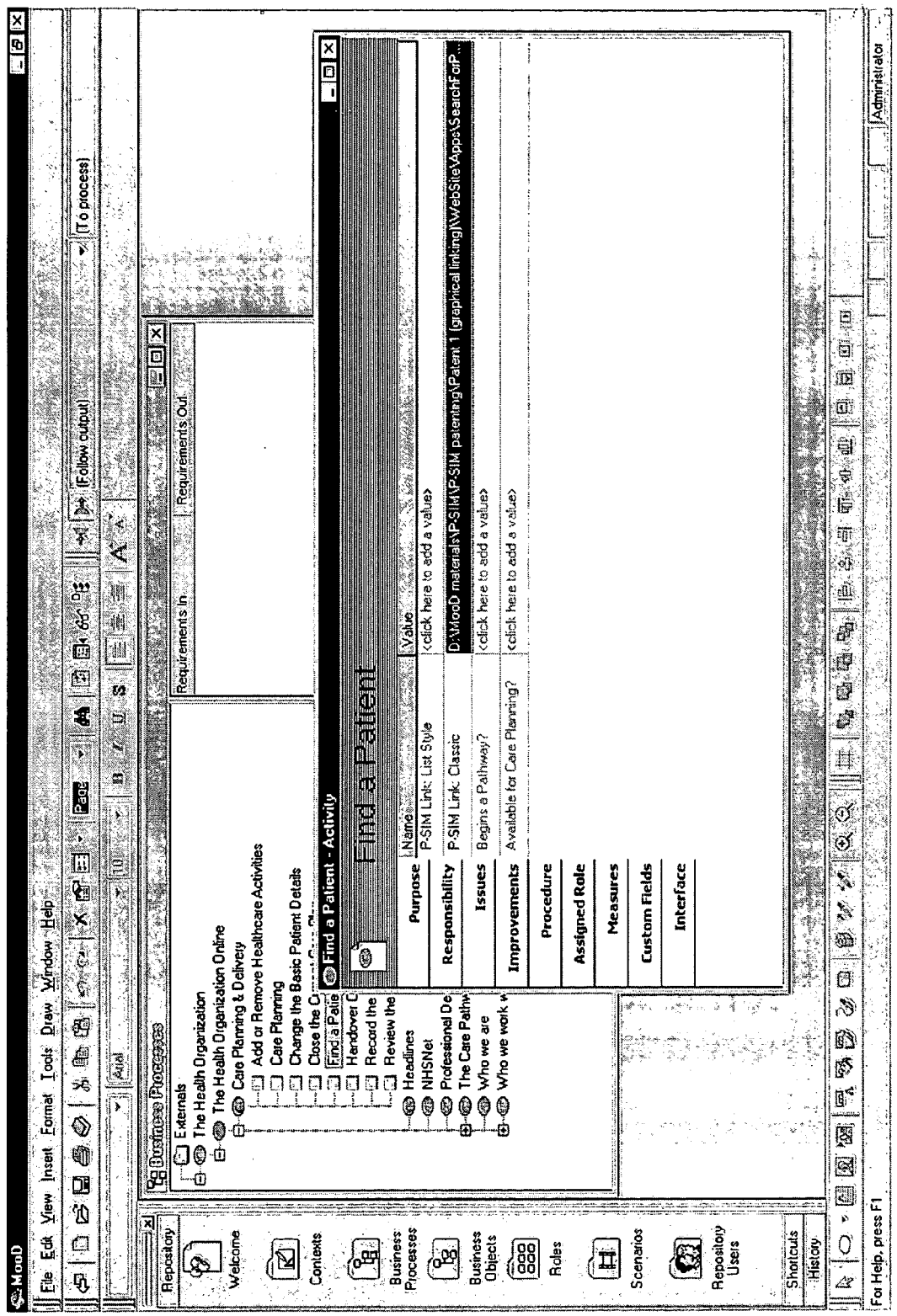
FIG. 7 shows a screen display of the mapping between the electronic form from FIG. 4 and the model element 'Find a Patient'.

3. FIG. 3 depicts a software tool in accordance with the invention, which represents the web-generated business models in a hierarchy form, and previews the web-pages generated from these as described in step 1. This tool allows the user to map arbitrary files to model elements as depicted in the hierarchy. FIG. 5 depicts the dragging of an HTML form developed in step 2 onto a model element in the hierarchy. FIG. 6 depicts the user choosing to map this form onto the model element. The tool sets up the mapping in a database, in this case using the database utilised by the business modelling tool, and replaces the appropriate pages in the published set of pages. FIG. 7 illustrates how the mapping appears in the modelling tool.

Figure 8:
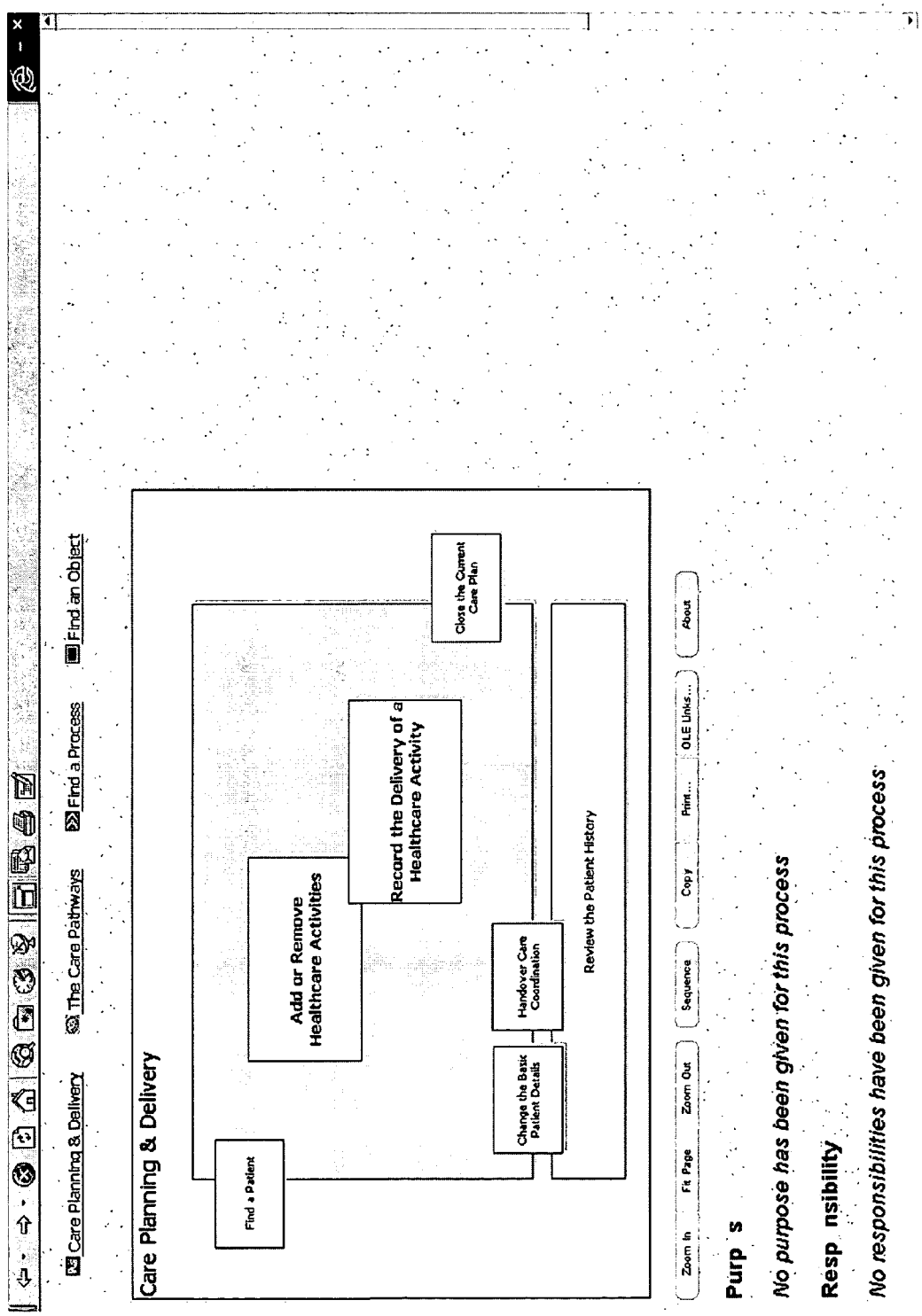
FIG. 8 shows a screen display of the published model 'Care Planning and Delivery' in accordance with the invention.

4. The system is published in the form of a web-site, with web pages for process models interleaved with active pages providing access to appropriate software behaviour. FIG. 8 gives an illustration of the 'Care Planning and Delivery Process' as it appears running in a browser for use by users of the system.

Figure 9:
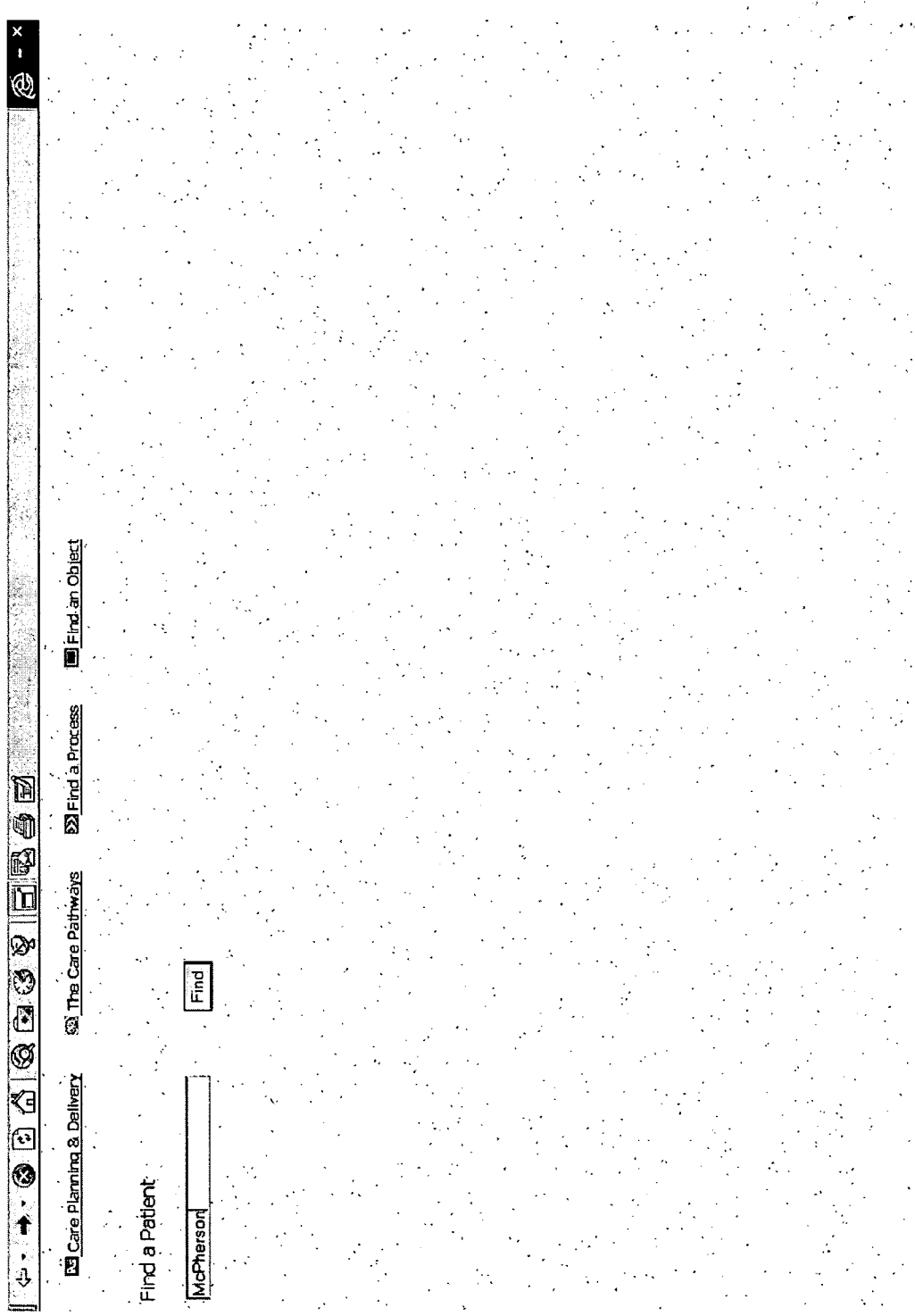
FIG. 9 shows a screen display of the published form, navigated to from the model element 'Find a Patient', and parameterised by the user.
Figure 10:
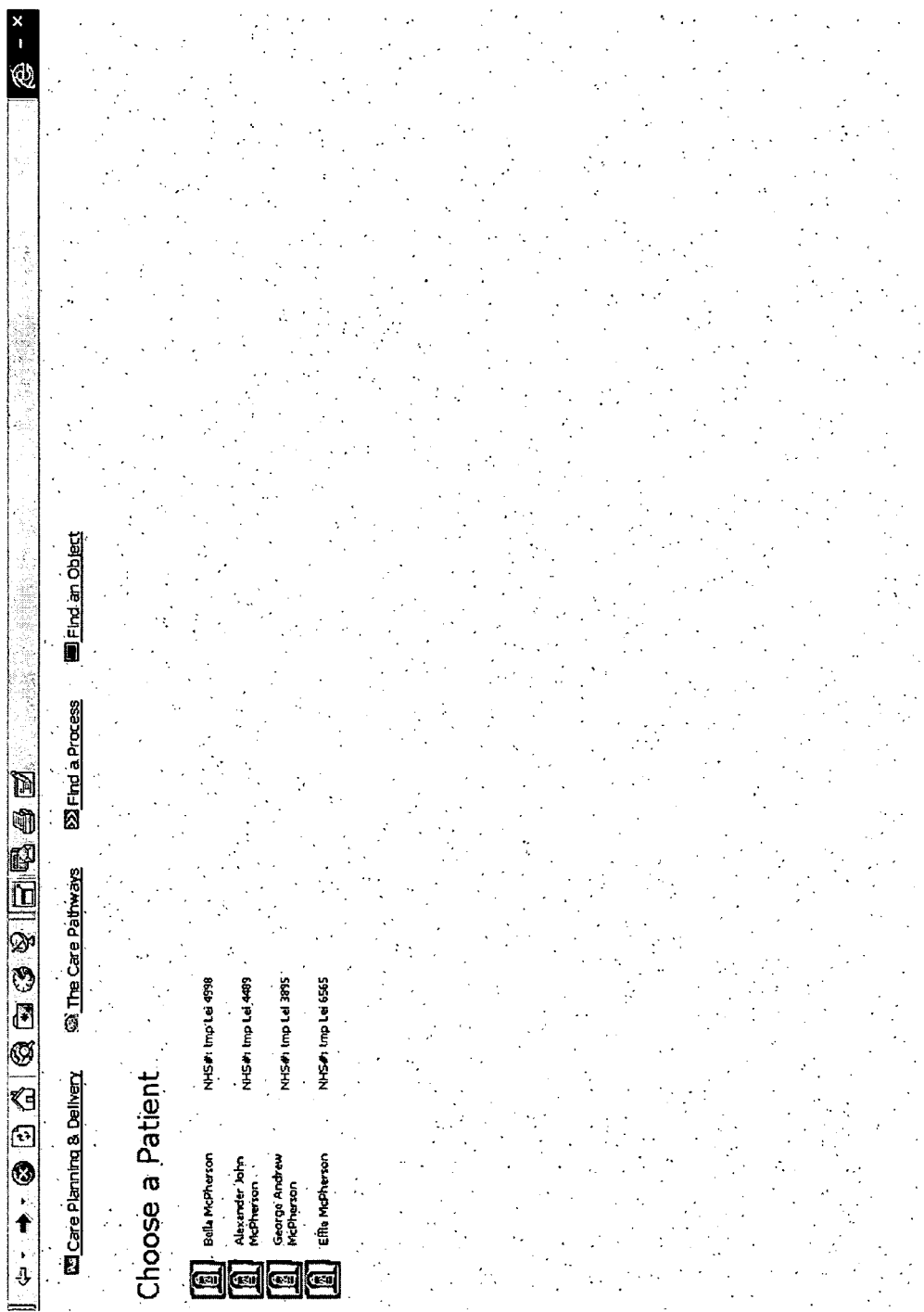
FIG. 10 shows a screen display of the results returned from the populated form.

FIG. 9 illustrates the result of a user selecting a model element 'Find a Patient' depicted in FIG. 8 and typing in some text to the text field. FIG. 10 depicts the result of the user selecting the 'Find' button on the form depicted in FIG. 9.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element.

The invention claimed is:

1. A method for creating and deploying a process-driven information system, said method comprising the following steps:
    (a) creating a plurality of process models, each including a plurality of elements in a process driven information system, said plurality of elements being displayed on a display screen and representing the work carried out by personnel in an organization, said mode forming a component of a hierarchical arrangement of cross referenced processes;
    (b) using said model to identify requirements for software application and information support components for said processes;
    (c) finding or creating one or more software application and information support components as support for said processes;
    (d) deploying the process-driven information system, with said software application and information system, with said software application and information support components accessible from designated elements in said processes, each element giving access to the software application or information support component;
    (e) selection by a user of one of said process models to be displayed on a screen to access said software application and information support components to direct operation of said software application and information support components, and wherein said plurality of elements of all of said process model are provided in a tool which uniquely identifies each of the said plurality of elements and which maps each of said plurality of elements to an application and information in the form of one or more software components so as to allow user access from the process model which is displayed on the screen to the one or more software components and wherein the user access of a particular software component is achieved by the user interacting with the screen to select, via a user selection tool, one of the elements graphically displayed to the user on the screen, whereupon the software component linked to the selected element is generated on screen for use by the user; and
    (f) the steps (a)–(d) are periodically repeated in a review cycle in which the process models and resources are revised and re-published as a new version and each of the process models which is available for selection include a plurality of elements and when one of said process models is selected for display on the display screen, all of the elements for that model are displayed on screen and the elements which are displayed upon each selection of a process model are selected with respect to that selected process model and vary from process model to process model.

2. A method according to claim 1 wherein said process model is part of a set of general purpose graphical business models.

3. A method according to claim 2 wherein said process model is accessible via a web browser.

4. A method according to claim 1 wherein said one or more software application and information support components are in the form of arbitrary alternative web pages and web-based resources.

5. A method according to claim 1 wherein said process model is used to educate users within an organization as to how the organization processes functions.

* * * * *